(12) United States Patent
Hu et al.

(10) Patent No.: US 12,356,518 B2
(45) Date of Patent: Jul. 8, 2025

(54) DIMMING CONTROL METHOD, SYSTEM, DEVICE, STORAGE MEDIUM, AND PROGRAM PRODUCT

(71) Applicants: Shenzhen Intellirocks Tech. Co., Ltd., Shenzhen (CN); Shenzhen Qianyan Technology LTD, Shenzhen (CN)

(72) Inventors: Weili Hu, Shenzhen (CN); Wenlong Wu, Shenzhen (CN)

(73) Assignees: Shenzhen Intellirocks Tech. Co., Ltd., Shenzhen (CN); Shenzhen Qianyan Technology LTD, Shenzhen (CN)

( * ) Notice: Subject to any disclaimer, the term of this patent is extended or adjusted under 35 U.S.C. 154(b) by 139 days.

(21) Appl. No.: 18/456,474

(22) Filed: Aug. 25, 2023

(65) Prior Publication Data

US 2024/0080951 A1 Mar. 7, 2024

(30) Foreign Application Priority Data

Sep. 6, 2022 (CN) .......................... 202211086146.3

(51) Int. Cl.
*H05B 45/10* (2020.01)
*H05B 45/48* (2020.01)

(52) U.S. Cl.
CPC ............. *H05B 45/10* (2020.01); *H05B 45/48* (2020.01)

(58) Field of Classification Search
CPC ........ H05B 45/10; H05B 45/48; H05B 45/20; H05B 47/18; H05B 47/155; Y02B 20/40
See application file for complete search history.

(56) References Cited

U.S. PATENT DOCUMENTS

| 9,750,093 B2 * | 8/2017 | Welten .................. H05B 45/14 |
| 11,102,870 B1 * | 8/2021 | Yeh ........................ H05B 47/16 |
| 2011/0164069 A1 * | 7/2011 | Thompson ............. H05B 45/38 345/102 |

* cited by examiner

*Primary Examiner* — Minh D A
(74) *Attorney, Agent, or Firm* — Wenye Tan (57) ABSTRACT

A dimming control method includes: receiving a dimming instruction, and determining a plurality of serial signals each corresponding to one of a plurality of output ports in a serial peripheral interface according to the dimming instruction, a serial signal including a plurality of dimming signals arranged in a sequence; outputting each serial signal through a corresponding output port according to a different time slot, so as to send the serial signal to the multiple control chips connected in series in the light strip link electrically connected to the corresponding output port; and causing each control chip in the multiple control chips to respond to the dimming signal corresponding to the time slot of the control chip in the received serial signal, and to control a light-emitting element electrically connected to the control chip to change a light-emitting state.

15 Claims, 5 Drawing Sheets

DIMMING CONTROL METHOD, SYSTEM, DEVICE, STORAGE MEDIUM, AND PROGRAM PRODUCT

CROSS-REFERENCES TO RELATED APPLICATIONS

This application claims priority to Chinese Patent Application No. CN202211086146.3, filed on Sep. 6, 2022, the content of which is hereby incorporated by reference in entirety.

FIELD OF THE TECHNOLOGY

The present disclosure relates to the technical field of lighting equipment control and, in particular, to a dimming control method, a dimming control device configured with the dimming control method, and a dimming control system.

BACKGROUND OF THE DISCLOSURE

With the continuous development of modern technologies, by controlling lamps, such as the luminous color, luminous brightness and luminous frequency of the light strips, the luminous effect of the light strips can be improved and the environmental atmosphere can be enhanced. In order to achieve the purpose of controlling the luminous color, luminous brightness and luminous frequency of a light strip, each LED light of the light strip is generally equipped with a control chip, such as the ws2811 chip commonly used in the industry, to control the luminous color, luminous brightness, and luminous frequency of each LED light of the light strip, so as to control the luminous effect of the light strip.

However, the control chip configured for the LED light is generally a dedicated chip, such as the ws2811 chip, and the timing control is relatively strict when receiving signals. When outputting the ws2811 signals to the ws2811 chip, it is usually necessary for the main control chip to be connected to a single-chip microcomputer to output the ws2811 signals to the ws2811 chip to ensure the accuracy of the timing, and the single-chip microcomputer can simultaneously control multiple light strips. Taking controlling the luminous color of LED lights as an example, the main control chip is connected to the single-chip microcomputer through a serial port or an IC interface. After the main control chip calculates the color data, it sends the color data to the single-chip microcomputer. The ws2811 signal is outputted to the ws2811 chip on the light strip, and the luminous color of the corresponding LED light is controlled by the ws2811 chip. Outputting the ws2811 signal to the ws2811 chip through an external single-chip microcomputer, although the timing stability is guaranteed, can greatly increase the cost due to the configuration of the single-chip microcomputer, reducing the market competitive efficiency.

In order to solve this problem, the industry proposed using the SPI interface (serial peripheral interface) on the main control chip, and the main control chip simulates the ws2811 signal through the SPI interface, so as to output the ws2811 signal to the light strip. Using the SPI interface to output the ws2811 signal to the light strip can save cost, because there are only one or two SPI interfaces on the main control chip, and the SPI interface can generally only connect and control one or two light strips. When there are three or more light strips, the main control chip cannot control the three or more LED strips through the SPI interface. However, more than ten LED strips are used in general application scenarios at the same time, which makes the application range of the SPI interface limited and not able to be used in applications on a large scale.

The disclosed methods and apparatus are directed to solve one or more problems set forth above and other problems.

SUMMARY

According to one aspect of the present disclosure, a dimming control method is provided for a dimming control device. The method includes: receiving a dimming instruction, and determining a plurality of serial signals each corresponding to one of a plurality of output ports in a serial peripheral interface according to the dimming instruction, a serial signal including a plurality of dimming signals arranged in a sequence; outputting each serial signal through a corresponding output port according to a different time slot, so as to send the serial signal to the multiple control chips connected in series in the light strip link electrically connected to the corresponding output port; and causing each control chip in the multiple control chips to respond to the dimming signal corresponding to the time slot of the control chip in the received serial signal, and to control a light-emitting element electrically connected to the control chip to change a light-emitting state.

According to another aspect of the present disclosure, a dimming control system is provided. The dimming control system includes a dimming controller, a main control chip, and a plurality of light strip links. The main control chip is equipped with a serial peripheral interface, and the serial peripheral interface includes a plurality of output ports, each output port being electrically connected to a corresponding light strip link; each light strip link includes multiple control chips connected in series; and the dimming controller is coupled to the main control chip and is used to trigger a dimming instruction. The main control chip is configured to: receive the dimming instruction, and determine a plurality of serial signals each corresponding to an output port in the serial peripheral interface according to the dimming instruction, a serial signal including a plurality of dimming signals arranged in a sequence; and output each serial signal through a corresponding output port according to a different time slot, so as to send the serial signal to the multiple control chips in the light strip link electrically connected to the corresponding output port. Further, each control chip is configured to: respond to the dimming signal corresponding to the time slot of the control chip in the received serial signal, and control a light-emitting element electrically connected to the control chip to change a light-emitting state.

According to another aspect of the present disclosure, a non-transitory computer-readable storage medium is provided. The non-transitory computer-readable storage medium contains computer-executable program codes for, when executed by one or more processors, performing a dimming control method. The method includes: receiving a dimming instruction, and determining a plurality of serial signals each corresponding to one of a plurality of output ports in a serial peripheral interface according to the dimming instruction, a serial signal including a plurality of dimming signals arranged in a sequence; outputting each serial signal through a corresponding output port according to a different time slot, so as to send the serial signal to the multiple control chips connected in series in the light strip link electrically connected to the corresponding output port; and causing each control chip in the multiple control chips to respond to the dimming signal corresponding to the time slot of the control chip in the received serial signal, and to control a light-emitting element electrically connected to the control chip to change a light-emitting state.

Accordingly, the present disclosure may have certain technical advantages.

On the one hand, the dimming control method of the present disclosure can use each output port of the serial peripheral interface in a time-division multiplexed manner, so that the serial peripheral interface can be connected to multiple light strip links at the same time, and can sequentially output serial signals to the multiple light strip links. This can overcome the problem that the traditional serial peripheral interface can only connect to one or two light strip links, or can only output signals to one or two light strip links, increase the utilization rate of the serial peripheral interface.

On the other hand, the dimming control method of the present disclosure can output each serial signal to each light strip link through the serial peripheral interface at different timing slots, so that the dimming control device does not need additional configuration of a single-chip microcomputer for outputting the serial signals to the light strip links, reducing the production cost of the dimming control equipment.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms "a", "an", "said" and "the" used herein may also include plural forms. It should be further understood that the word "comprising" used in the description of the present disclosure refers to the presence of said features, integers, steps, operations, elements and/or components, but does not exclude the presence or addition of one or more other features, integers, steps, operations, elements and/or components, but does not preclude the presence or addition of one or more other features, integers, steps, operations, elements, components and/or groups thereof. It will be understood that when an element is referred to as being "connected" or "coupled" to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this invention belongs.

The present disclosure provides a dimming control method. The dimming control method is implemented based on a dimming control device. The method is used to enable a main control chip to be connected to multiple light strip links through a serial peripheral interface. After the main control chip receives the dimming instruction sent by a dimming controller, the main control chip analyzes and converts the dimming instruction into a serial signal that can be recognized by the control chips in the light strip link. After that, the main control chip sends multiple serial signals corresponding to multiple light strip links to the multiple light strip links sequentially in a time-division multiplexed manner. The control chips in the light strip links recognize the information in the serial signals, and control the light-emitting element electrically connected to the control chips to change light-emitting state.

Figure 1:
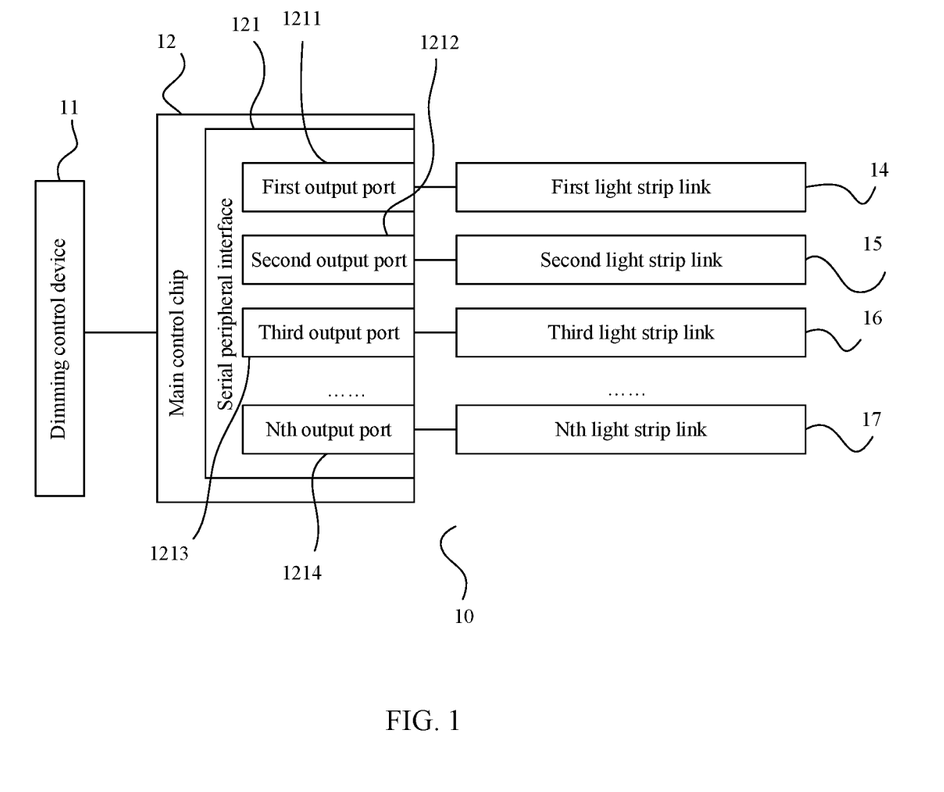
FIG. 1 illustrates a schematic circuitry diagram of a dimming control system according to an embodiment of the present disclosure.

In one embodiment of the present disclosure, with reference to FIG. 1, the present disclosure provides a dimming control system 10. The dimming control system 10 includes a dimming controller 11, a main control chip 12, and a plurality of light strip links 13. The dimming controller 11 is electrically connected to the main control chip 12, and the main control chip 12 is electrically connected to the plurality of light strip links 13.

The dimming controller 11 is used to output dimming instructions to the main control chip 12 to drive the main control chip 12 to dim the plurality of light strip links 13. The term 'dim" may refer to adjusting or changing any or various characteristics of a light or lights, such as color, brightness, frequency, saturation, etc. In one embodiment, the dimming controller 11 is a computer or a mobile terminal device, such as a mobile phone. The user can issue a dimming command to the main control chip 12 through the dimming controller 11 to control multiple light strip links for dimming. A dimming control device may refer to the main control chip 12 and its related circuitry, with or without the connected light strip links 13. In some embodiments, the dimming controller 11 may also be considered as a part of the dimming control device.

After the main control chip 12 receives a dimming instruction from the dimming controller 11, the main control chip 12 parses the dimming instruction and converts it into a serial signal that can be recognized by the light strip link 13, and drives the light strip link 13 to change its light-emitting state. For example, the main control chip 12 is a single-chip microcomputer or a central processing unit (CPU). In one embodiment, the main control chip 12 is disposed in a computer and is a component of the computer.

The main control chip 12 is provided with a serial peripheral interface, and the main control chip 12 is connected to the plurality of light strip links 13 through the serial peripheral interface. Specifically, the serial peripheral interface is provided with a plurality of output ports, and each output port is connected to a corresponding light strip link 13. For example, the plurality of light strip links 13 are divided into a first light strip link 14, a second light strip link 15, a third light strip link 16 . . . the Nth light strip link 17. The first light strip link 14 is connected to the first output port 1211 of the serial peripheral interface, the second light strip link 15 is connected to the second output port 1212 of the serial peripheral interface, and the third light strip link 16 is connected to the third output port 1213 of the serial peripheral interface, and by analogy, the Nth light strip link 17 is connected with the Nth output port 1214 of the serial peripheral interface. For example, the output port of the serial peripheral interface is a pin.

Figure 2:
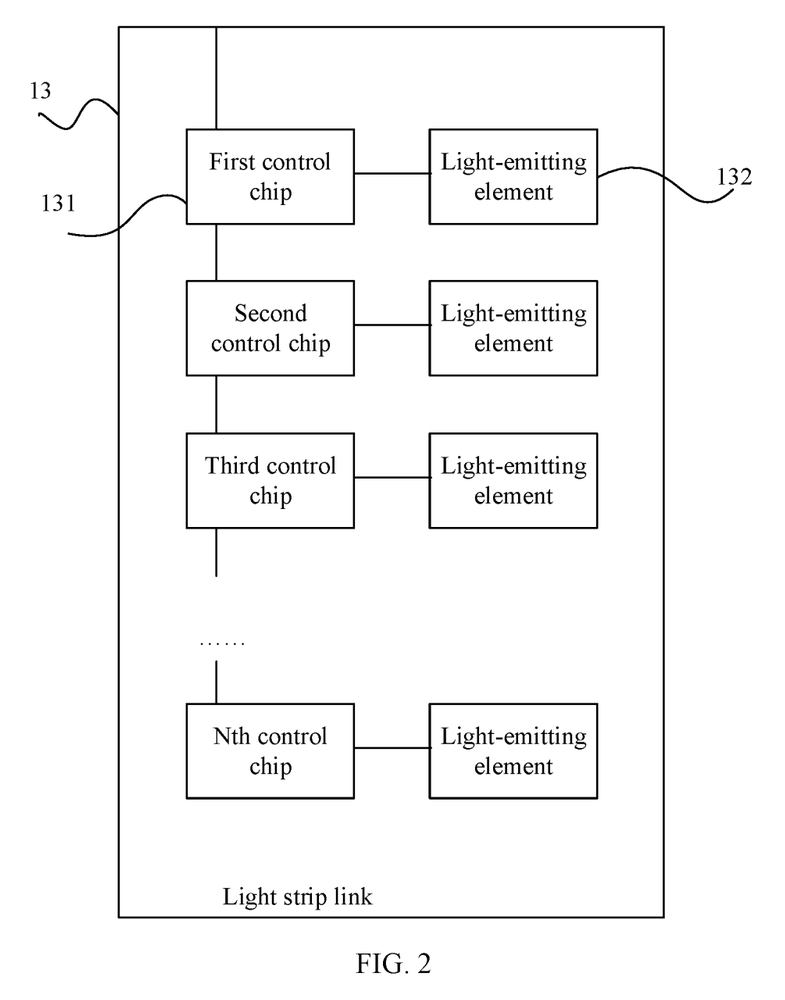
FIG. 2 illustrates a schematic circuitry diagram of a light strip link of a dimming control device according to an embodiment of the present disclosure.

Referring to FIG. 2, the light strip link 13 includes a plurality of control chips 131 connected in series. The control chips 131 are connected in series with each other in sequence, and each control chip 131 is electrically connected to the corresponding light-emitting element 132, respectively. The control chip 131 is used to control the light-emitting state of the corresponding light-emitting element 132. For example, the control chip 131 controls one or more of the light-emitting color, light-emitting brightness, and light-emitting frequency of the light-emitting element 132. In one embodiment, the light emitting element 132 is an LED light, and the control chip 131 is a ws2811 chip. A light-emitting element may include more than one LED light or may include other types of light(s).

The light strip link 13 can receive the serial signal outputted by the main control chip 12. The serial signal includes a plurality of dimming signals, and the multiple dimming signals correspond to the multiple light emitting elements 132 in the light strip link 13, and the arrangement order of multiple dimming signals in the serial signal corresponds to the arrangement order of the corresponding light-emitting elements 132 in the light strip link 13. The multiple control chips 131 are connected in series in the light strip link 13 and sequentially receive the corresponding dimming signals. After receiving the corresponding dimming signal, the control chip 131 controls the light-emitting element to change its light-emitting state based on the dimming information included in the dimming signal.

For the specific implementation of dimming methods of the control device, referring to the dimming control method described below, which is not repeated here.

Figure 3:
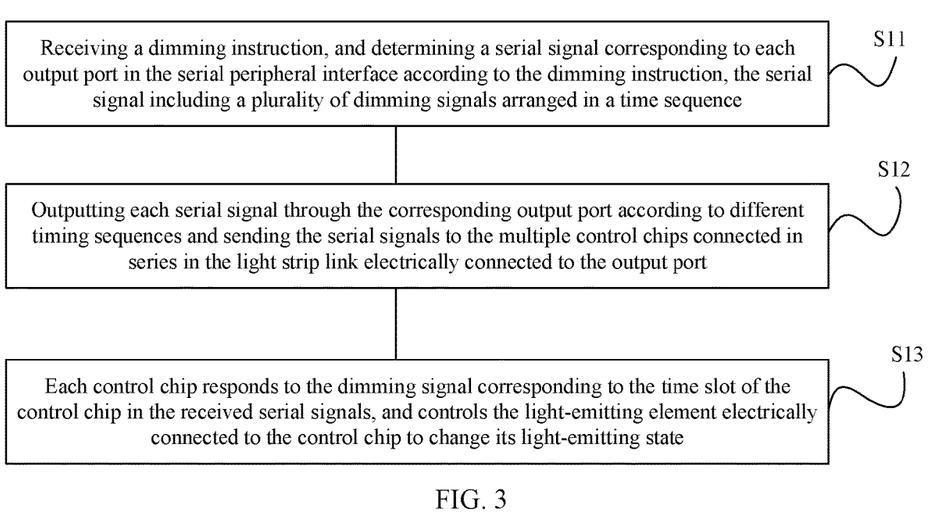
FIG. 3 illustrates a schematic flow chart of a dimming control method according to an embodiment of the present disclosure.

In one embodiment of the present disclosure, referring to FIG. 3, the dimming control method includes the following.

S11, receiving a dimming instruction, and determining a serial signal corresponding to each output port in the serial peripheral interface according to the dimming instruction, the serial signal including a plurality of dimming signals arranged in a time sequence.

The dimming controller generates the dimming instruction, and the dimming instruction is used to control the plurality of light strip links to change their lighting states. For example, in some embodiments, when the user needs to change the luminous effect of one or more of the plurality of light strip links, the user can adjust the light-emitting information corresponding to one or more of the plurality of light strip links by operating the dimming controller. The light-emitting information for a light strip link includes the light-emitting state information of multiple or all light-emitting elements in the light strip link. The light-emitting state information includes one or more of the light-emitting color, light-emitting brightness, and light-emitting frequency, etc. The dimming controller encapsulates the light-emitting state information corresponding to each of the plurality of light strip links into a dimming instruction, and sends the dimming instruction to the main control chip.

After receiving the dimming instruction, the main control chip analyzes the plurality of light-emitting information items in the dimming instruction, and the light-emitting information includes light-emitting state information of the plurality of light-emitting elements in the light strip link. The main control chip encapsulates the light-emitting information into a serial signal. More specifically, the main control chip obtains a plurality pieces of light-emitting state information from the light-emitting information, encapsulates the plurality pieces of light-emitting state information into dimming signals respectively, arranges the dimming signals in a same sequence in which the control chips in the corresponding light strip link are sequentially arranged, and modulates the sequentially arranged dimming signals into the serial signal.

Figure 4:
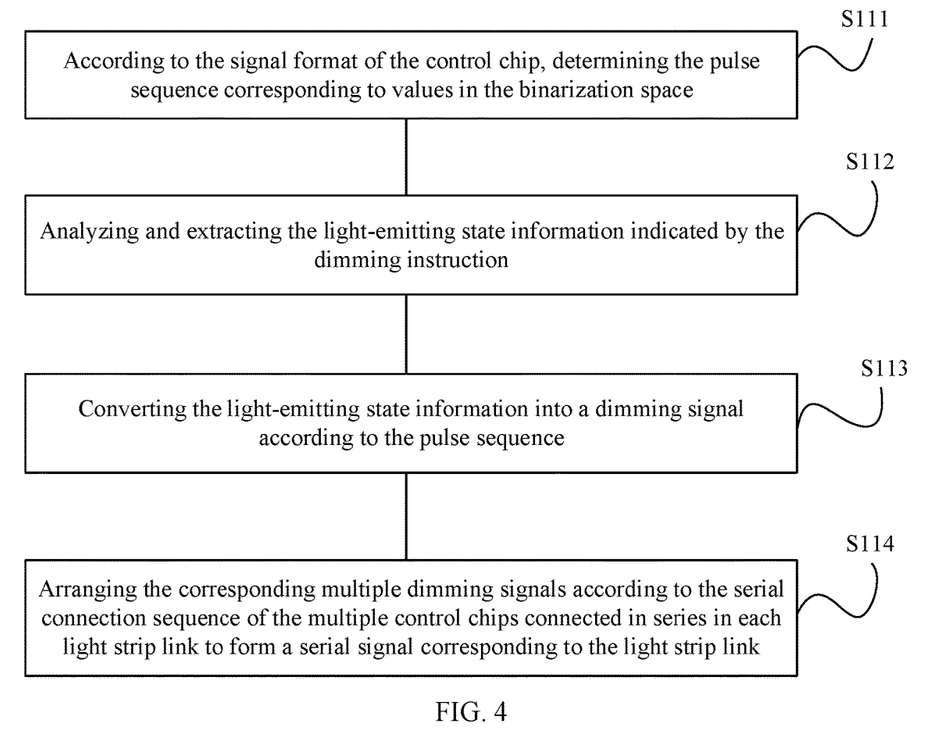
FIG. 4 illustrates a schematic flow chart of S11 of the dimming control method according to an embodiment of the present disclosure.

Specifically, with reference to FIG. 4, the S11 also includes the following.

S111, according to the signal format of the control chip, determining the pulse sequence corresponding to values in the binarization space.

The control chip has its own signal format. If the signal of the dimming information outputted by the main control chip to the control chip does not match the signal format that the control chip can read, the control chip cannot read the dimming signal in a different signal format, so that the control chip cannot control the light-emitting elements electrically connected to it.

The main control chip obtains the signal format data of the control chip in advance, and obtains the pulse sequence of numerical values in the binarization space from the signal format data. Specifically, values in the binarization space is 0 and 1. The pulse sequence is the expression form of all numerical values in the binarization space, expressing each numerical value in the binarization space in the form of a pulse wave. For example, expressing a pulse sequence of 1 in the binarization space with a high voltage level, and expressing a pulse sequence of 0s in the binarized space with a low voltage level. The dimming signal is composed of pulse sequences corresponding to various values in the binarization space, forming a pulse signal.

In some application environments, when the control chip is ws2811, in the pulse sequence corresponding to values in the binarization space corresponding to the signal format of the control chip: V0 represents 0 in the binarization space, and V1 represents 1 the binarization space.

Figure 7:
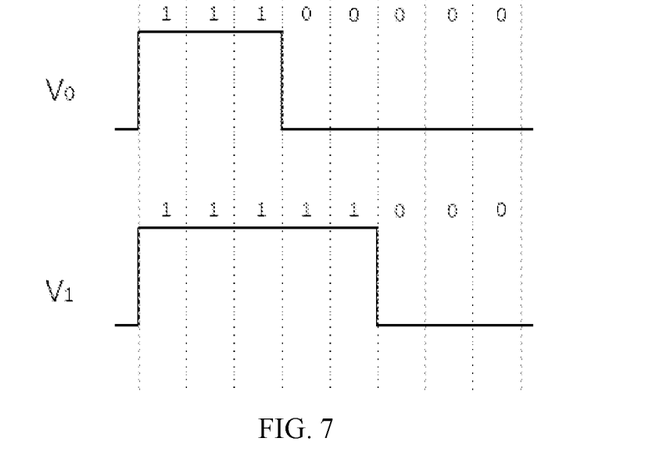
FIG. 7 illustrates a pulse sequence diagram corresponding to $V_0$ and $V_1$ according to an embodiment of the present disclosure.

Specifically, in V0, the high level time is 0.4 μs, and the low level time is 0.85 μs. When the pulse signal is transmitted in this pulse sequence, it represents V0. The high level is represented by 1 in binary, and the low level is represented by binary 0, then V0 is expressed in binary as 11100000b, and if V0 is converted to hexadecimal, it is expressed as 0xe0, that is, 11100000b/0xe0 represents the pulse sequence of 0 in the binary space of the signal format of the control chip sequence. For details, referring to the pulse sequence diagram of V0 in FIG. 7.

In V1, the high level time is 0.85 μs, and the low level time is 0.4 μs. When the pulse signal is transmitted in this pulse sequence, it represents V1. The high level is represented by 1 in binary, and the low level is represented by binary 0, then V1 is expressed in binary as 11111000b, and if V1 is converted into hexadecimal, it is expressed as 0xf8, that is, 11111000b/0xf8 represents the pulse sequence of 1 in the binary space of the signal format of the control chip. For details, referring to the pulse sequence diagram of V1 in FIG. 7.

After the main control chip obtains the signal format of the control chip, and determines the pulse sequence corresponding to each value in the binary space, the main control chip obtains the light-emitting information in the dimming instruction, and encapsulates the dimming signals with the pulse sequence corresponding to the signal format of the control chip.

S112, analyzing and extracting the light-emitting state information indicated by the dimming instruction.

After the dimming controller outputs the dimming instruction to the main control chip, the main control chip parses and extracts a plurality pieces of light-emitting information from the dimming instruction, and each light-emitting information corresponds to a light strip link. The light-emitting information includes a plurality pieces of light emitting state information, each light emitting state information corresponds to a control chip in the light strip link, and each control chip is electrically connected to a corresponding light emitting element. The light-emitting state information includes one or more of light-emitting color information, light-emitting brightness information, and light-emitting frequency information of the light-emitting element of the corresponding control chip. For example, the light-emitting state information includes light-emitting color information of the corresponding light-emitting element, that is, RGB information, specifically RGB values.

S113, converting the light-emitting state information into a dimming signal according to the pulse sequence.

After the main control chip parses the light-emitting information of each light strip link from the dimming instruction, based on the signal format of the control chip, the main control chip encapsulates the light-emitting state information of each control chip in the corresponding light strip link in the light-emitting information as the dimming signal. After receiving the corresponding dimming signal, the control chip can control the electrically connected light-emitting element to change the light-emitting state based on the dimming signal.

In some application environments, when the control chip is a ws2811 chip, the main control chip encapsulates the dimming signal based on the signal format of the ws2811 chip. Specifically, the main control chip converts the light-emitting state information acquired through analysis into values in the binary space corresponding to the signal format of the control chip, that is, converting the light-emitting state information into binary values.

Afterwards, the main control chip converts the binary value corresponding to the light-emitting state information into a dimming signal based on the pulse sequence corresponding to the values in the binary space determined by the signal format of the control chip. Specifically, the main control chip converts the binary value corresponding to the light-emitting state information into a binary value or a hexadecimal value in the form of the pulse sequence, and generates the dimming signal by obtaining the high level and low level of the control pulse signal in the binary value or hexadecimal value.

Figure 8:
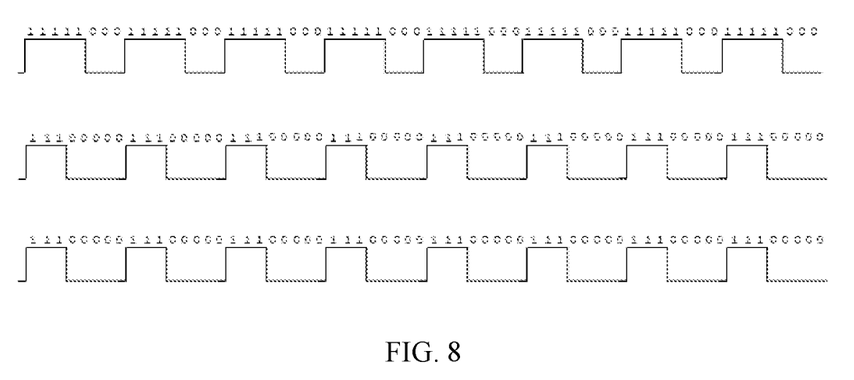
FIG. 8 illustrates a pulse sequence diagram corresponding to RGB (255, 0, 0) according to an embodiment of the present disclosure.

For example, when the light-emitting state information of the i-th control chip of the i-th light strip link received by the main control chip is light-emitting color information, that is, RGB information. For example, the RGB information is specifically (255, 0, 0). Based on the signal format of the control chip, the main control chip binarizes the RGB information into (11111111, 00000000, 00000000), and then the main control chip converts the binary data of the RGB information into a hexadecimal value based on the pulse sequence of the control signal. (0xf8 0xf8 0xf8 0xf8 0xf8 0xf8 0xf8 0xf8, 0xe0 0xe0 0xe0 0xe0 0xe0 0xe0 0xe0 0xe0, 0xe0 0xe0 0xe0 0xe0 0xe0 0xe0 0xe0 0xe0), with reference to FIG. 8, where the top pulse sequence corresponds to R: 255, the middle pulse sequence corresponds to G: 0 corresponds, and the bottom pulse sequence corresponds to B: 255, and then the main control chip generates a corresponding pulse signal based on the hexadecimal value corresponding to the RGB information, that is, the dimming signal is generated.

S114, arranging the corresponding multiple dimming signals according to the serial connection sequence of the multiple control chips connected in series in each light strip link to form a serial signal corresponding to the light strip link.

When the main control chip encapsulates each light-emitting state information in the light-emitting information into a dimming signal, the main control chip arranges the multiple dimming signals corresponding to the same light strip link in a sequence, based on the serial connection sequence of the plurality of control chips in the light strip link corresponding to each light-emitting state information, to form the serial signal.

Specifically, using the serial connection sequence of the plurality of serially connected control chips in the light strip link, the main control chip arranges the binary or hexadecimal values corresponding to the multiple dimming signals in series to generate the binary or hexadecimal values corresponding to the serial signal and, then, generates the serial signal by obtaining the high and low levels of the pulse signal of the control pulse signal in the binary value or hexadecimal value corresponding to the serial signal.

S12, outputting each serial signal through the corresponding output port according to different timing sequences and sending the serial signals to the multiple control chips connected in series in the light strip link electrically connected to the output port.

After the main control chip parses and extracts out a plurality pieces of light-emitting information from the received dimming instruction, each light-emitting information corresponding to a light strip link, the main control chip generates dimming signals corresponding to the plurality pieces of light-emitting state information in the light-emitting information. Further, the dimming signals are arranged in the sequence in which the control chips in the light strip link are serially connected to generate the serial signal. A corresponding serial signal is generated corresponding to each light strip link.

Further, the main control chip sequentially outputs the plurality of serial signals respectively corresponding to different light strip links to the light strip links through the serial peripheral interface in a time-division multiplexed manner. Specifically, the main control chip arranges multiple serial signals in a sequence according to the timing sequence of each serial signal. That is, the main control chip divides the time of the signal output of the serial peripheral interface into several timing sequences, that is, into N time slots, and sends a serial signal to the outside at each time slot, so that multiple serial signals are sent to the corresponding light strip link in sequence using the multiple time slots.

Moreover, since the plurality of light strip links are respectively connected to the corresponding output ports in the serial peripheral interface, the main control chip outputs the serial signal to the light strip link through the output port corresponding to the light strip link.

For example, the main control chip generates multiple serial signals based on the dimming instruction. The first serial signal corresponds to the first light strip link, and the first light strip link is connected to the first output port of the serial peripheral interface. The second serial signal corresponds to the second light strip link, and the second light strip link is connected to the second output port of the serial peripheral interface. The third serial signal corresponds to the third light strip link, and the third light strip link is connected to the third output port of the serial peripheral interface, and so on. The Nth serial signal corresponds to the Nth light strip link, and the Nth light strip link is connected to the Nth output port of the serial peripheral interface.

The main control chip divides the time of the signal output of the serial peripheral interface into N time sequences in sequence, that is, into N time slots or slices. At the first time slot, the first serial signal is outputted through the first output port to the first light strip link. At the second time slot, the second serial signal is outputted through the second output port to the second light strip link. At the third time slot, the third serial signal is outputted through the third output port to the third light strip link . . . . At the Nth time slot, the Nth serial signal is outputted through the Nth output port to the Nth light strip link.

Thus, the main control chip sequentially sends multiple serial signals to corresponding multiple light strip links at different timing sequences in a time-division multiplexing manner.

Figure 5:
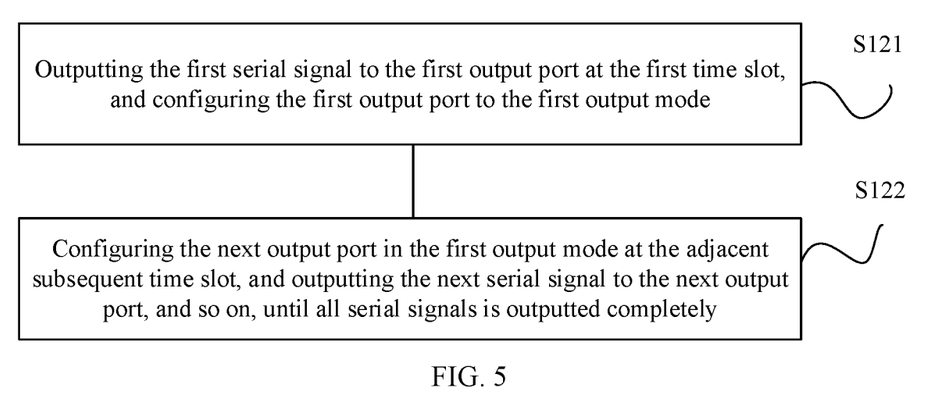
FIG. 5 illustrates a schematic flow chart of S12 of the dimming control method according to an embodiment of the present disclosure.

In one embodiment, referring to FIG. 5, the S12 also includes the following.

S121, outputting the first serial signal to the first output port at the first time slot, and configuring the first output port to the first output mode.

In order to enable the main control chip to output serial signals to the corresponding light strip links through the corresponding output ports of the serial peripheral interface, the main control chip configures the output port of the serial peripheral interface that needs to be used in the corresponding time slot. For example, the main control chip configures an output port in the first output mode, so that the main control chip only uses the output port configured in the first output mode to output the serial signal to the corresponding light strip link at the corresponding time slot. Moreover, the main control chip configures other output ports of the serial peripheral interface in the second output mode, and the output ports configured as the second output mode output different external signals or do not output any signal.

For example, the main control chip configures the first output port of the serial peripheral interface as the first output mode at the first time slot, so that the main control chip transmits the first serial signal through the first output port configured as the first output mode at the first time slot. The first output port outputs to the corresponding first light strip link, so that the first light strip link receives the corresponding first serial signal in a directional manner, which avoids sending the serial signal to a non-corresponding light strip link.

S122, configuring the next output port in the first output mode at the adjacent subsequent time slot, and outputting the next serial signal to the next output port, and so on, until all serial signals is outputted completely.

At the first time slot, after the main control chip outputs a serial signal to the first light strip link through the first output port configured as the first output mode, the main control chip configures the first output port as the second output mode. In the second output mode, the first output port no longer outputs signals to the outside.

At the next time slot to the first time slot, i.e., the second time slot, the main control chip configures the second output port of the serial peripheral interface in the first output mode. At the second time slot, the main control chip outputs the corresponding serial signal to the second light strip link through the second output port configured in the first output mode, so that the second light strip link receives the corresponding second serial signal in a directional manner, preventing the main control chip from outputting serial signals to non-corresponding light strip links.

In one embodiment, the S12 also includes the following.

S123, determining the output frequency of the pulse sequence in each dimming signal in the serial signal according to the predetermined signal period of the control chip, and outputting the serial signal of each pulse sequence according to the output frequency.

After the main control chip obtains the signal format of the control chip, the main control chip obtains the predetermined signal period of the control chip based on the signal format, and the predetermined signal period is the time required for the control chip to receive one byte of data. The main control chip associates the predetermined signal period with the serial peripheral interface, so that the serial peripheral interface outputs signals at the predetermined signal period.

The main control chip calculates the output frequency of the serial peripheral interface through the predetermined signal period, that is, the receiving frequency of the control chip. Afterwards, the main control chip outputs the serial signal based on the output frequency of the serial peripheral interface, and outputs the pulse sequence of the serial signal at the output frequency, so as to prevent the output frequency of the serial signal from being different from the working frequency of the control chip.

In some application environments, when the control chip is ws2811, the main control chip determines the predetermined signal period of the control chip according to the signal format of the ws2811 control chip. When the serial peripheral interface outputs 8 bit data each time, the predetermined signal period is the time required to output a byte of data. Based on the period calculation formula $T=8*(1/F)$, where T is the predetermined signal period, F is the frequency, 8 represents the number of bits of a byte of data, and 8 bits are used to represent a byte, then the output frequency of the serial peripheral interface is calculated as $F=8/T$. For example, when the predetermined signal period T is 1 μs, then based on the output frequency calculation formula, the output frequency of the serial peripheral interface can be F=8 MHz, that is, the serial peripheral interface needs to output the serial signal to the light strip link at a frequency of 8 MHz.

In one embodiment, the S12 also includes the following.

S124, inserting at the end of each serial signal an interval signal to distinguish the current serial signal from the next serial signal.

The main control chip outputs each serial signal to the corresponding light strip link, so as to control each light strip link to emit light of predetermined color and/or brightness and/or frequency. In order to enable each serial signal to be outputted to the corresponding light strip link, when the main control chip generates the serial signal according to the dimming instruction, an interval signal is connected to the end of each serial signal, and the interval signal is used to distinguish two adjacent serial signals, so as to prevent the main control chip from outputting serial signals to non-corresponding light strip links.

For example, if the main control chip generates successively adjacent first serial signals, second serial signals, and third serial signals, and there is no interval signal at the end of each of the three serial signals, the three serial signals are arranged sequentially, the first serial signal is outputted to the first light strip link, the second serial signal is outputted to the second light strip link, and the third serial signal is outputted to the third light strip link. When the main control chip outputs the signals, the main control chip may switch the output port before the first serial signal is completely outputted to the first light strip link, resulting in the remaining part of the first serial signal being outputted to the second light strip link. The first light strip link cannot completely receive the first serial signal, which affects the light emission of the first light strip link. At the same time, because part of the first serial signal is outputted to the second light strip link, it will affect the light emission of the second light strip link, and even the light emission of the third light strip link.

In the present disclosure, the main control chip sets/inserts interval signals at the end of each serial signal. When the main control chip switches the output port to output serial signals to different light strip links, the output port is switched after the interval signal is read, so that each serial signal is outputted to the corresponding light strip link through the corresponding output port, avoiding outputting part or all of the data of the non-corresponding serial signal to the non-corresponding in the light strip link.

The main control chip generates the interval signal representing each numerical value in the binarization space determined by the signal format of the control chip, such as 0 in the binarization space. In one embodiment, the interval signals are generated all with 0s in the binarization space, for example, 16 0s are used to represent the interval signals. In another embodiment, each interval signal has the same word length.

In another embodiment, the S12 also includes the following.

S125, each of the serial signals is outputted through a message queue, wherein the serial signals whose word length is smaller than the message queue are appended to be equal to the message queue, so that each serial signal is sent at the same time interval.

The main control chip outputs the serial signal to the corresponding light strip link through the message queue to improve the data transmission efficiency. The message queue has a certain data size. When the data volume of the serial signal is less than the data volume set by the message queue or the word length of the serial signal is less than the word length set by the message queue, the main control chip append or pad the serial signal, so that the data volume or word length of the serial signal meets the requirements of the message queue. In one embodiment, the main control chip appends or pad the serial signal with a numerical value in the binarization space determined by the signal format of the control chip, for example, 0 in the binarization space.

By padding each serial signal to the size of the message queue, that is, each serial signal has the same data volume or word length, and the main control chip sets the same output time for multiple serial signals. The output time corresponds to the output duration of the message queue, so that the duration of each serial signal sent by the main control chip is the same, and each serial signal can be completely outputted to the corresponding light strip link, avoiding the situation wherein, because each serial signal has different data size, and has different sending time, after outputting the serial signal to the previous light strip link, and without switching to the next output port, the serial signal of another light strip link is then sent to the same light strip link again.

For example, the first serial signal and the second serial signal are arranged sequentially, the first serial signal corresponds to the first light strip link, the second serial signal corresponds to the second light strip link, and the first serial signal The word length of the line signal is the word length of the message queue. The main control chip outputs the first serial signal to the first light strip link through the first output port within a predetermined time length. The output time of the first serial signal is less than the predetermined time length. As a result, after the main control chip outputs the first serial signal, it immediately outputs the second serial signal to the first light strip link through the first output port, and the main control chip switches to the second output until the predetermined time is reached. The port outputs the remaining part of the second serial signal to the second light strip link, thereby disturbing the output of the serial signal.

S13, each control chip responds to the dimming signal corresponding to the time slot of the control chip in the received serial signals, and controls the light-emitting element electrically connected to the control chip to change its light-emitting state.

After the light strip link receives the corresponding serial signal, multiple control chips connected in series in the light strip link sequentially read the corresponding dimming signal in the serial signal, and the control chip controls the corresponding dimming signal. The light-emitting element changes the light-emitting state.

Specifically, multiple control chips are serially connected to the light strip link, for example, the first control chip, the second control chip, the third control chip . . . until the Nth control chip is sequentially connected in series. The serial signal includes a plurality of sequentially arranged dimming signals corresponding to the plurality of control chips, and the light-emitting state information contained in each dimming signal is the same or different. For example, the serial signal includes the first dimming signal, the second dimming signal, the third dimming signal . . . until the Nth dimming signal, which are sequentially connected in series.

When the light strip link receives the serial signal, each control chip in the light strip link sequentially extracts the corresponding dimming signal from the serial signal, and outputs the serial signal containing the remaining dimming signals to the next control chip. For example, the first control chip in the light strip link extracts the first dimming signal from the serial signal, and outputs the serial signal with the first dimming signal removed to the second control chip. The second control chip extracts the second dimming signal from the received serial signal, and outputs the serial signal without the first dimming signal and the second dimming signal to the third control chip, and so on, until the Nth control chip extracts the last remaining Nth dimming signal from the serial signal.

After the control chip extracts the corresponding dimming signal from the serial signal, the control chip controls the light-emitting element to change the light-emitting state based on the light-emitting state information included in the dimming signal. The light-emitting state information includes one or more of light-emitting color information, light-emitting brightness information, and light-emitting frequency information, etc. For example, when the light-emitting state information includes light-emitting color information RGB (255, 0, 0), the control chip drives the light-emitting element to change its light-emitting color to a color corresponding to RGB (255, 0, 0).

Multiple control chips connected in series in the light strip link obtain corresponding dimming signals from the serial signal, and each of the multiple control chips controls the electrically connected light-emitting element to change the light-emitting state based on the corresponding dimming signal. The dimming signals obtained by the plurality of control chips are the same or different, so that the corresponding light emitting elements of the plurality of control chips emit the same light or different light.

Figure 6:
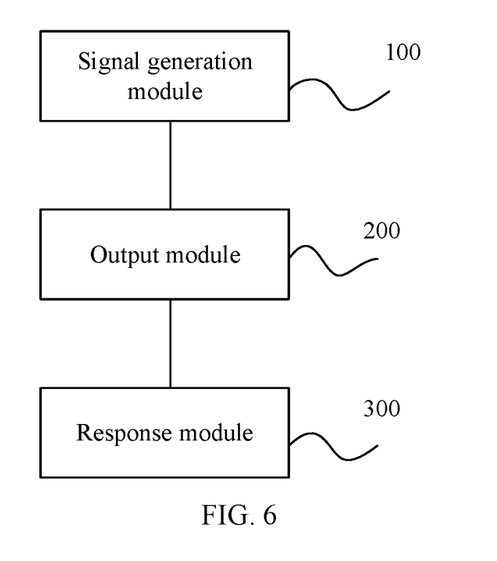
FIG. 6 illustrates a schematic structural diagram of a dimming control device according to an embodiment of the present disclosure.

The present disclosure also provides a dimming control device. Referring to FIG. 6, the dimming control device includes: a signal generation module 100, an output module 200, and a response module 300, etc.

The signal generation module 100 is configured to receive a dimming instruction, and determine a serial signal corresponding to each output port in the serial peripheral interface according to the dimming instruction, the serial signal including a plurality of dimming signals arranged in a time sequence.

The output module 200 is configured to output each serial signal through the corresponding output port according to different timing sequences and send the serial signals to the multiple control chips connected in series in the light strip link electrically connected to the output port.

The response module 300 is configured to cause each control chip to respond to the dimming signal corresponding to the time slot of the control chip in the received serial signals, and control the light-emitting element electrically connected to the control chip to change its light-emitting state.

The present disclosure also provides a storage medium storing computer-readable instructions. When the computer-readable instructions are executed by one or more processors, the one or more processors are configured to perform a dimming control method according to various embodiments of the present disclosure.

The present disclosure also provides a computer program product containing computer programs/instructions for, when the computer programs/instructions are executed by one or more processors, performing the dimming control method according to various embodiments of the present disclosure can be implemented.

Those of ordinary skill in the art can understand that all or part of the processes in the various embodiments of the present disclosure can be realized by instructing related hardware through a computer program, and the computer program can be stored in a computer-readable storage medium. When the program is executed, the processes of the embodiments of the present disclosure can be implemented. The storage medium may be a computer-readable storage medium such as a magnetic disk, an optical disk, a read-only memory (ROM), or a random access memory (RAM), etc.

Accordingly, the present disclosure provides a dimming control method. By the dimming control method, the main control chip sends multiple serial signals corresponding to multiple light strip links to the multiple light strip links sequentially in a time-division multiplexed manner. The main control chip can output signals to multiple light strip links without an external microcontroller, reducing production cost and allowing the serial peripheral interface to connect to multiple light strip links at the same time, improving the utilization efficiency of the serial peripheral interface.

Those skilled in the art can understand that the various operations, methods, and steps, measures, and schemes in the processes that have been discussed in this disclosure can be replaced, changed, combined, or deleted. Furthermore, the various operations, methods, and other steps, measures, and schemes in the process that have been discussed in this disclosure can also be replaced, changed, rearranged, decomposed, combined, or deleted. Further, steps, measures, and schemes in the prior art that have operations, methods, and processes disclosed in the present application may also be alternated, changed, rearranged, decomposed, combined, or deleted.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A dimming control method for a dimming control device, comprising:
   receiving, by a main control chip, a dimming instruction, and determining a plurality of serial signals each corresponding to one of a plurality of output ports in a serial peripheral interface according to the dimming instruction, wherein a serial signal includes a plurality of dimming signals arranged in a sequence;
   outputting each serial signal through a corresponding output port according to a different time slot, so as to send the plurality of serial signals to multiple control chips connected in series in the light strip link electrically connected to the corresponding output port; and
   causing each control chip in the multiple control chips to respond to the dimming signal corresponding to a time slot of the control chip in the serial signal received by the control chip, and to control a light-emitting element electrically connected to the control chip to change a light-emitting state, wherein the determining the plurality of serial signals each corresponding to one of the plurality of output ports in the serial peripheral interface according to the dimming instruction further comprises: according to a signal format of the control chips, determining a pulse sequence corresponding to each numerical value in a binarization space; extracting out light-emitting state information from the dimming instruction; converting the lighting state information into the dimming signals according to the pulse sequence; according to a serial connection sequence of the multiple control chips connected in series in the light strip link, arranging the corresponding multiple dimming signals to form a serial signal corresponding to the light strip link.

2. The method according to claim 1, wherein the outputting each serial signal through a corresponding output port according to a different time slot further comprises:
determining an output frequency of the pulse sequence in each dimming signal in the serial signal according to a predetermined signal period of the control chips, and outputting the serial signal of each pulse sequence according to the output frequency.

3. The method according to claim 1, wherein the outputting each serial signal through a corresponding output port according to a different time slot further comprises:
outputting a first serial signal to a first output port at a first time slot, and configuring the first output port to a first output mode; and
configuring a next output port in the first output mode at an adjacent subsequent time slot, and outputting a next serial signal to the next output port, until all serial signals is outputted completely.

4. The method according to claim 1, wherein the outputting each serial signal through a corresponding output port according to a different time slot further comprises:
inserting at an end of each serial signal an interval signal to distinguish the serial signal from a next serial signal.

5. The method according to claim 1, wherein the light-emitting state includes one or more of light-emitting frequency, light-emitting color, and light-emitting brightness.

6. A dimming control system, comprising:
a dimming controller, a main control chip, and a plurality of light strip links, wherein:
the main control chip is equipped with a serial peripheral interface, and the serial peripheral interface includes a plurality of output ports, each output port being electrically connected to a corresponding light strip link;
each light strip link includes multiple control chips connected in series;
the dimming controller is coupled to the main control chip and is used to trigger a dimming instruction;
the main control chip is configured to:
receive the dimming instruction, and determine a plurality of serial signals each corresponding to an output port in the serial peripheral interface according to the dimming instruction, wherein a serial signal includes a plurality of dimming signals arranged in a sequence; and
output each serial signal through a corresponding output port according to a different time slot, so as to send the plurality of serial signals to multiple control chips in the light strip link electrically connected to the corresponding output port; and
each control chip is configured to:
respond to the dimming signal corresponding to a time slot of the control chip in the serial signal received by the control chip, and control a light-emitting element electrically connected to the control chip to change a light-emitting state, wherein, to determine the plurality of serial signals each corresponding to the output port in the serial peripheral interface according to the dimming instruction, the main control chip is further configured to: according to a signal format of the control chips, determine a pulse sequence corresponding to each numerical value in a binarization space; extract out light-emitting state information from the dimming instruction; convert the lighting state information into dimming signals according to the pulse sequence; according to a serial connection sequence of the multiple control chips connected in series in a light strip link, arrange the corresponding multiple dimming signals to form a serial signal corresponding to the light strip link.

7. The dimming control system according to claim 6, wherein, to output each serial signal through a corresponding output port according to a different time slot, the main control chip is further configured to:
determine an output frequency of the pulse sequence in each dimming signal in the serial signal according to a predetermined signal period of the control chips, and output the serial signal of each pulse sequence according to the output frequency.

8. The dimming control system according to claim 6, wherein, to output each serial signal through a corresponding output port according to a different time slot, the main control chip is further configured to:
output a first serial signal to a first output port at a first time slot, and configure the first output port to a first output mode; and
configure a next output port in the first output mode at an adjacent subsequent time slot, and outputting a next serial signal to the next output port, until all serial signals is outputted completely.

9. The dimming control system according to claim 6, wherein, to output each serial signal through a corresponding output port according to a different time slot, the main control chip is further configured to:
insert at an end of each serial signal an interval signal to distinguish the serial signal from a next serial signal.

10. The dimming control system according to claim 6, wherein the light-emitting state includes one or more of light-emitting frequency, light-emitting color, and light-emitting brightness.

11. A non-transitory computer-readable storage medium containing computer-executable instructions for, when executed by one or more processors, performing a dimming control method, the method comprising:
receiving a dimming instruction, and determining a plurality of serial signals each corresponding to one of a plurality of output ports in a serial peripheral interface according to the dimming instruction, wherein a serial signal includes a plurality of dimming signals arranged in a sequence;
outputting each serial signal through a corresponding output port according to a different time slot, so as to send the plurality of serial signals to multiple control chips connected in series in the light strip link electrically connected to the corresponding output port; and
causing each control chip in the multiple control chips to respond to the dimming signal corresponding to a time slot of the control chip in the serial signal received by the control chip, and to control a light-emitting element electrically connected to the control chip to change a light-emitting state, wherein the determining the plurality of serial signals each corresponding to one of the plurality of output ports in the serial peripheral interface according to the dimming instruction further comprises: according to a signal format of the control chips, determining a pulse sequence corresponding to each numerical value in a binarization space; extracting out light-emitting state information from the dimming instruction; converting the lighting state information into dimming signals according to the pulse sequence; according to a serial connection sequence of the multiple control chips connected in series in a light strip link, arranging the corresponding multiple dimming signals to form a serial signal corresponding to the light strip link. .

12. The non-transitory computer-readable storage medium according to claim 11, wherein the outputting each serial signal through a corresponding output port according to a different time slot further comprises:
determining an output frequency of the pulse sequence in each dimming signal in the serial signal according to a predetermined signal period of the control chips, and outputting the serial signal of each pulse sequence according to the output frequency.

13. The non-transitory computer-readable storage medium according to claim 11, wherein the outputting each serial signal through a corresponding output port according to a different time slot further comprises:
outputting a first serial signal to a first output port at a first time slot, and configuring the first output port to a first output mode; and
configuring a next output port in the first output mode at an adjacent subsequent time slot, and outputting a next serial signal to the next output port, until all serial signals is outputted completely.

14. The non-transitory computer-readable storage medium according to claim 11, wherein the outputting each serial signal through a corresponding output port according to a different time slot further comprises:
inserting at an end of each serial signal an interval signal to distinguish the serial signal from a next serial signal.

15. The non-transitory computer-readable storage medium according to claim 11, wherein the light-emitting state includes one or more of light-emitting frequency, light-emitting color, and light-emitting brightness.

\* \* \* \* \*